US011186161B2

(12) United States Patent
Qiu et al.

(10) Patent No.: US 11,186,161 B2
(45) Date of Patent: Nov. 30, 2021

(54) HYBRID TRANSMISSION AND HYBRID ELECTRIC VEHICLE

(71) Applicants: GEELY HOLDING GROUP CO., LTD., Zhejiang (CN); NINGBO UMD AUTOMATIC TRANSMISSION CO., LTD., Zhejiang (CN)

(72) Inventors: Zhiling Qiu, Zhejiang (CN); Jun Fu, Zhejiang (CN); Daguo Luo, Zhejiang (CN); Pengpeng Li, Zhejiang (CN); Shiquan Gou, Zhejiang (CN); Lin Zhu, Zhejiang (CN); Xiaozhe Lin, Zhejiang (CN); Ruiping Wang, Zhejiang (CN)

(73) Assignees: GEELY HOLDING GROUP CO., LTD., Hangzhou (CN); NINGBO UMD AUTOMATIC TRANSMISSION CO., LTD., Ningbo (CN)

(*) Notice: Subject to any disclaimer, the term of this patent is extended or adjusted under 35 U.S.C. 154(b) by 0 days.

(21) Appl. No.: 17/040,072

(22) PCT Filed: Mar. 22, 2018

(86) PCT No.: PCT/CN2018/079944
§ 371 (c)(1),
(2) Date: Sep. 22, 2020

(87) PCT Pub. No.: WO2019/178796
PCT Pub. Date: Sep. 26, 2019

(65) Prior Publication Data
US 2021/0016652 A1 Jan. 21, 2021

(51) Int. Cl.
*B60K 6/365* (2007.10)
*B60K 6/442* (2007.10)
*F16H 3/58* (2006.01)

(52) U.S. Cl.
CPC .............. *B60K 6/365* (2013.01); *B60K 6/442* (2013.01); *F16H 3/58* (2013.01)

(58) Field of Classification Search
CPC ........... B60K 6/365; B60K 6/442; F16H 3/58; F16H 2200/2097
See application file for complete search history.

(56) References Cited

U.S. PATENT DOCUMENTS 7,220,203 B2 * 5/2007 Holmes ..................... B60K 6/48
475/5
2006/0019785 A1 * 1/2006 Holmes ................. B60K 6/365
475/5

(Continued)

FOREIGN PATENT DOCUMENTS

CN 102770689 A 11/2012

*Primary Examiner* — Tinh Dang (57) ABSTRACT

A hybrid transmission and a vehicle having the hybrid transmission. An engine, a generator, and a motor are coaxially arranged; a first planetary gear set is separately connected to a crankshaft of the engine and a rotor of the generator; a clutch comprises a first driving end connected to a planet carrier of the first planetary gear set and a second driving end connected to a ring gear of a second planetary gear set, wherein the first driving end and the second driving end are involved in engagement and disengagement; a rotor of the motor is connected to a sun gear axle of the second planetary gear set. When the motor performs driving, the clutch is disengaged from the engine and the generator to avoid a drag resistance of the engine.

17 Claims, 6 Drawing Sheets

(56) References Cited

U.S. PATENT DOCUMENTS

| | | | |
|---|---|---|---|
| 2007/0149334 A1* | 6/2007 | Holmes | F16H 3/727 475/5 |
| 2010/0270096 A1* | 10/2010 | Holmes | B60K 6/383 180/65.275 |
| 2012/0270691 A1* | 10/2012 | Tuckfield | F16H 3/728 475/5 |
| 2015/0183423 A1* | 7/2015 | Yamamoto | B60W 20/00 477/3 |
| 2015/0210269 A1* | 7/2015 | Maruyama | B60K 6/445 477/18 |
| 2015/0298685 A1* | 10/2015 | Ono | B60K 6/445 701/22 |
| 2016/0185206 A1* | 6/2016 | Kubo | B60K 6/547 475/5 |
| 2017/0274754 A1* | 9/2017 | Imamura | B60W 20/10 |
| 2018/0031085 A1* | 2/2018 | Steinberger | B60K 6/387 |
| 2018/0264927 A1* | 9/2018 | Komada | B60K 6/387 |
| 2019/0291714 A1* | 9/2019 | Kasahara | B60W 10/06 |

* cited by examiner

HYBRID TRANSMISSION AND HYBRID ELECTRIC VEHICLE

FIELD OF THE INVENTION

The invention relates to the technical field of vehicles, and in particular to a hybrid transmission and a hybrid electric vehicle.

BACKGROUND OF THE INVENTION

Hybrid electric vehicles generally use two energy sources to drive vehicles: liquid fuel used in conventional internal combustion engines (ICE), and electric energy used in electric motors (EM).

There are also two common driving manners of how to use these two energy sources: a P2 parallel manner which means that an electric motor is connected parallelly to an input shaft of a transmission; and a power split manner which means that an electric motor is connected parallelly to an output shaft of a transmission. The former is widely used in hybrid vehicles produced in Europe, and the latter is commonly used in Japanese vehicles. A hybrid system in the P2 parallel manner can not only realize separate multi-speed drive of an engine and an electric motor, but also simultaneously drive the engine and the electric motor, so that a vehicle has good acceleration performance. When the electric motor performs driving alone, the engine is disengaged from an output shaft of the electric motor, which reduces driving resistance and results in high fuel economy. However, this hybrid transmission system requires two to three clutches and a plurality of shifting mechanisms, so that it needs high costs to manufacture and takes up a lot of space, making it difficult to use in low- and mid-standard vehicles.

Figure 1:
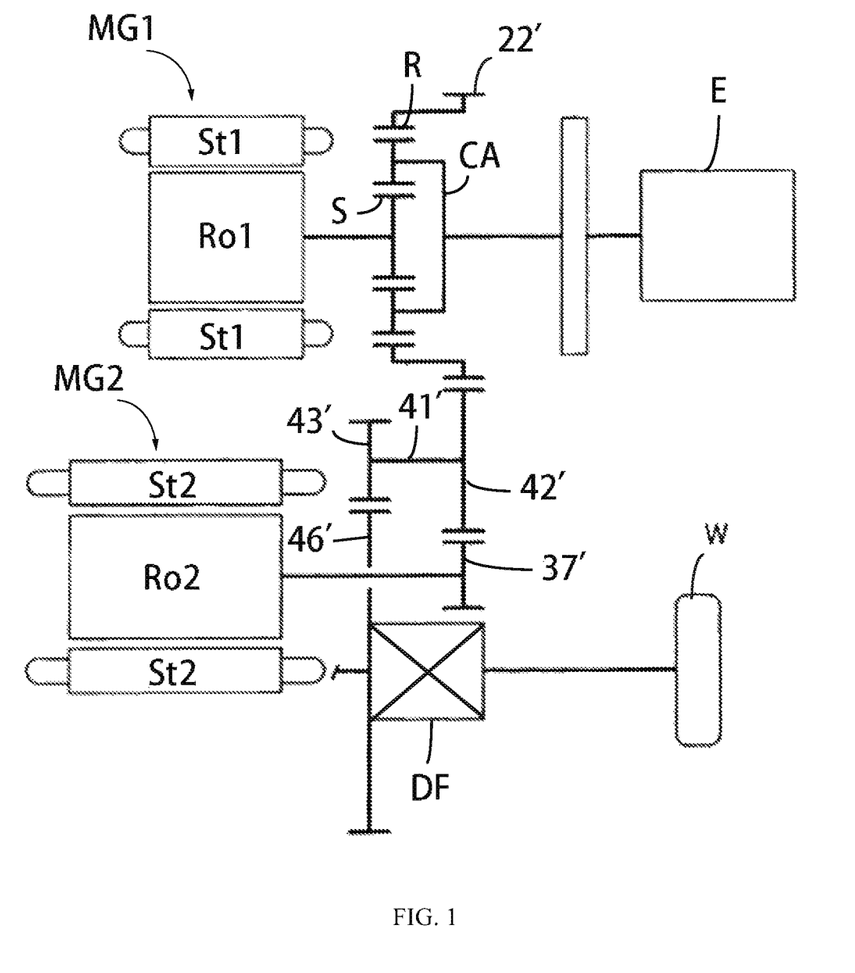
FIG. 1 is a schematic structural diagram of a hybrid transmission in the prior art.

Another type of hybrid electric vehicles adopt a two-motor power distributing transmission scheme. As shown in FIG. 1 of Chinese patent No. CN102770689A, the engine E is connected to the planet carrier CA, the rotor shaft 31 of the first rotating electric machine MG1 is coupled to the sun gear S, and the torque output by the annular gear R is transmitted to the output shaft 41' through the gear pair 22', 42'. A part of power of the engine is used to drive the rotor of the MG1 to generate electric power, and the other part power drives the wheels via the ring gear. During low-speed running of the vehicle, the second rotating electric machine MG2 drives the wheels W via the gear pairs 37', 42' and 43', 46', and the differential DF. During high-speed or low-potential running of the vehicle, the engine can also be used to assist in driving the wheels.

The transmission of such hybrid transfer method has a simple structure and takes up less space, so that it is widely used in Japanese vehicles. However, such hybrid transfer method also has the following disadvantages:

(i) When the second rotating electric machine MG2 performs driving alone, the engine E and the first rotating electric machine MG1 cannot be disengaged from the output shaft 41', and their drag resistance will reduce the driving efficiency of the second rotating electric machine MG2; and (ii) When fast starting or climbing is required, all power of the engine cannot be fully used for driving as a part of the power of the engine is allocated to the first rotating electric machine MG1, so that the acceleration performance of such hybrid electric vehicles cannot meet usage requirements.

SUMMARY OF THE INVENTION

A first objective of the invention is to provide a hybrid transmission (also referred as a hybrid power transmission) to solve technical problems in the prior art that the engine and the output shaft which drives the rotating electric machine cannot be disengaged, and that the drag resistance by the engine affects the driving efficiency when the rotating electric machine performs driving.

A second objective of the invention is to provide a hybrid electric vehicle employing the aforementioned hybrid transmission.

According to the aforementioned first objective, the invention provides a hybrid transmission including an engine, a generator, an electric motor, a first planetary gear set, a clutch, and a second planetary gear set;

the engine, the generator and the electric motor are arranged coaxially;

a crankshaft of the engine is connected to the first planetary gear set, and the first planetary gear set is connected to a rotor of the generator to drive the rotor to rotate; and the clutch includes a first driving end and a second driving end that can be engaged or disengaged; the first driving end is connected to the first planetary gear set, and the second driving end is connected to a ring gear of the second planetary gear set; and the ring gear is further provided with an output gear for driving wheels, and a rotor of the electric motor is connected to a sun gear axle of the second planetary gear set.

Further, the ring gear is further provided with an output gear for driving wheels.

Further, the first planetary gear set and the engine are coaxially arranged.

Further, the second planetary gear set and the engine are coaxially arranged.

Further, the first planetary gear set is capable of increasing a speed of the engine and driving the generator to rotate.

Further, the first planetary gear set is configured as a single-row planetary gear train; a planet carrier of the first planetary gear set is separately connected to the crankshaft of the engine, the first driving end of the clutch and a planetary gear of the first planetary gear set; and a sun gear of the first planetary gear set is connected to the rotor of the generator.

Further, the first planetary gear set is configured as a double-row planetary gear train; a sun gear of the first planetary gear set is separately connected to the crankshaft of the engine and a rotor of the generator; and a ring gear of the first planetary gear set is connected to the first driving end of the clutch.

Further, the planet carrier of the first planetary gear set is configured to be rotatable.

Further, the planet carrier of the second planetary gear set is configured to be stationary, and the second planetary gear set is capable of increasing an output torque of the electric motor.

Further, the clutch is a drum clutch; an inner drum of the clutch is the first driving end, and an outer drum of the clutch is the second driving end.

Further, the hybrid transmission further includes a shock absorber connected to the crankshaft of the engine.

Further, the generator is further electrically connected to the engine to drive the engine to rotate.

According to the aforementioned first objective, the invention also provides another hybrid transmission including an engine, a generator, an electric motor, a clutch, and a third planetary gear set;

the engine, the generator and the electric motor are arranged coaxially;

a crankshaft of the engine is connected to a rotor of the generator to drive the rotor to rotate;

the clutch includes a first driving end and a second driving end that can be engaged or disengaged; the first driving end is connected to the rotor of the generator, and the second driving end is connected to a ring gear of the third planetary gear set; and the ring gear is provided with an output gear for driving wheels, and a rotor of the electric motor is connected to a sun gear axle of the third planetary gear set.

Further, a planet carrier of the third planetary gear set is configured to be stationary, and the third planetary gear set is capable of increasing an output torque of the electric motor.

Further, the clutch is a drum clutch, an inner drum of the clutch is the first driving end, and an outer drum of the clutch is the second driving end.

Further, this hybrid transmission further includes a shock absorber connected to the crankshaft of the engine.

According to the aforementioned second objective, the invention provides a hybrid electric vehicle including wheels, a wheel drive mechanism, a differential, and a hybrid transmission aforementioned; the wheels are connected to the differential through wheel axles, and the wheel drive mechanism is separately connected to the differential and an output gear in a transmission way.

Further, the wheel drive mechanism includes an output shaft, an output shaft driven gear, and an output shaft driving gear, the output shaft driven gear and the output shaft driving gear are coaxially connected; the output shaft driving gear is used to connect a ring gear of the differential, and the output shaft driven gear is used to connect the output gear.

With the aforementioned technical solutions, the invention has the following beneficial effects in comparison with the prior art:

(1) The engine, the generator and the electric motor are arranged coaxially, and the crankshaft of the engine is connected to the rotor of the generator directly or via the first planetary gear set, which not only improves the gear transmission accuracy and NVH performance (noise, vibration and acoustic vibration roughness), but also simplifies the manufacturing difficulty and reduces costs;

(2) In order to overcome the defect of large drag resistance by the engine when the electric motor performs driving, the invention uses a disengagable clutch to disengage the engine from the electric motor, thereby reducing the drag resistance by the engine when the electric motor performs driving, and improving fuel economy; and (3) In order to solve the problem of power dispersion in the existing two-motor split type hybrid transmission when the engine performing driving, according to the technical solution of the invention, when the engine is required to perform driving, the torque of the generator is controlled to 0, and all the torque of the engine can be transmitted to the wheel drive mechanism through the clutch. When the electric motor also performs driving, the torque of the electric motor is also transmitted to the wheel drive mechanism via the corresponding planetary gear sets. The torque of the two power sources is superimposed on the wheel drive mechanism to maximize the acceleration performance of vehicles.

The hybrid electric vehicle provided by the invention adopts the abovementioned hybrid transmission and has the advantages of the hybrid transmission accordingly.

BRIEF DESCRIPTION OF THE DRAWINGS

Hereafter the accompanying drawings for the specific embodiments or the description of the prior art will be briefly introduced in order to more clearly explain the specific embodiments of the invention or the technical solutions in the prior art. Obviously, the drawings are some embodiments of the invention. For those skilled in the art, modification could be made to the drawings to obtain other designs without creative efforts.

In the drawings: 1: engine; 2: crankshaft; 3: shock absorber; 4: first planetary gear set; 41, 61, 61': ring gear; 42, 63, 63': planet carrier; 43, 65, 65 ': sun gear; 44, 62, 62': planetary gear; 5: generator; 51, 92: rotor; 52, 91: stator; 6: second planetary gear set; 6': third planetary gear set; 64, 64': sun gear axle; 7: clutch; 8, 8': output gear; 9: electric motor; 16: output shaft driven gear; 17: output shaft driving gear; 18: output shaft; 19: differential ring gear; 20: differential; and 21: wheel.

DETAILED DESCRIPTION OF PREFERRED EMBODIMENTS

The technical solutions of the invention will be further described clearly and completely below with reference to the accompanying drawings and embodiments. Obviously, the described embodiments are part of the embodiments of the invention, but not all of the embodiments. Based on the embodiments of the invention, all other embodiments obtained by those skilled in the art without creative efforts fall within the protection scope of the invention.

Embodiment 1

Figure 2:
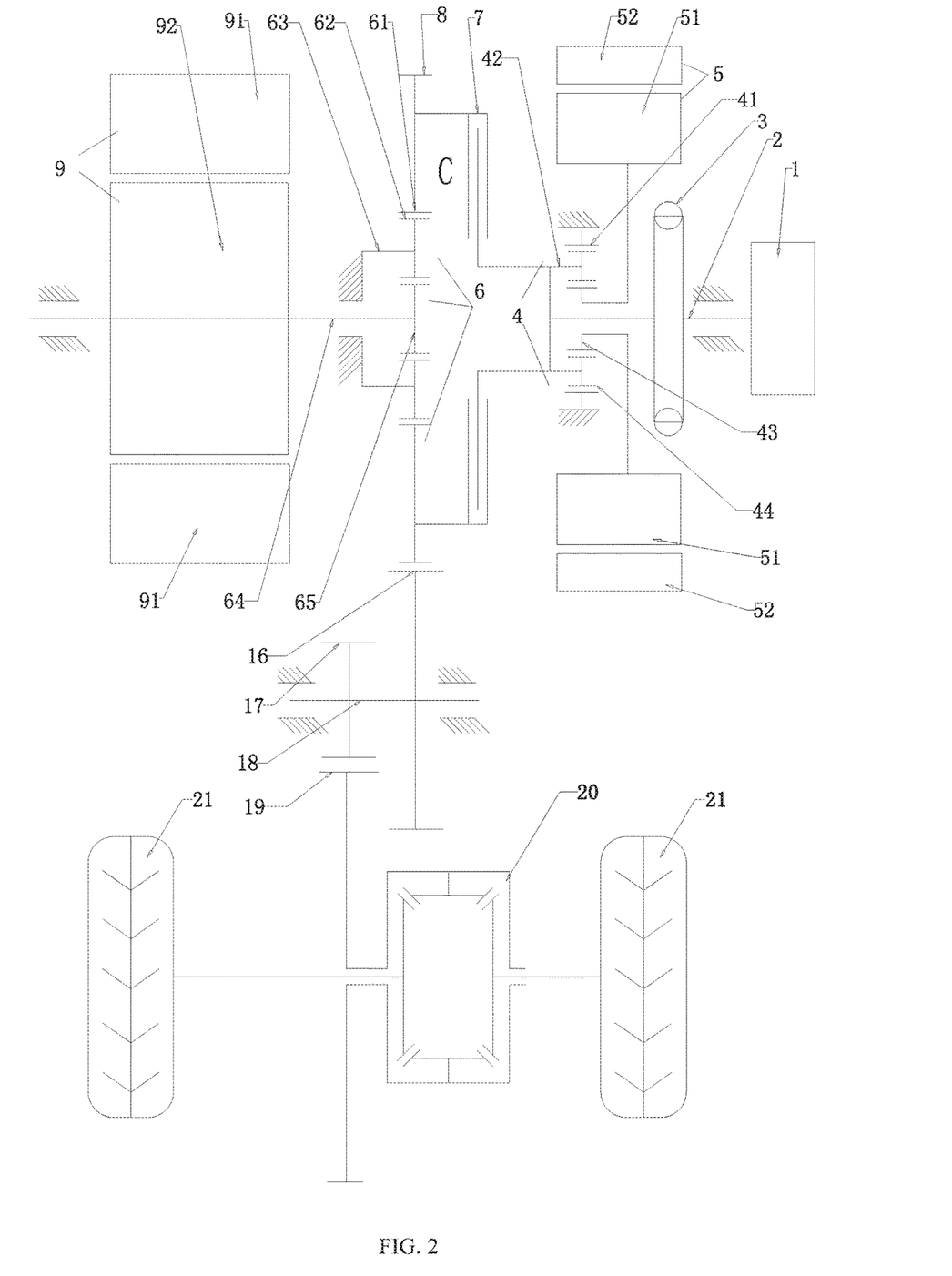
FIG. 2 is a schematic structural diagram of power transmission of a hybrid electric vehicle (using a single-row planetary gear set) according to Embodiment 1 of the invention.
Figure 4:
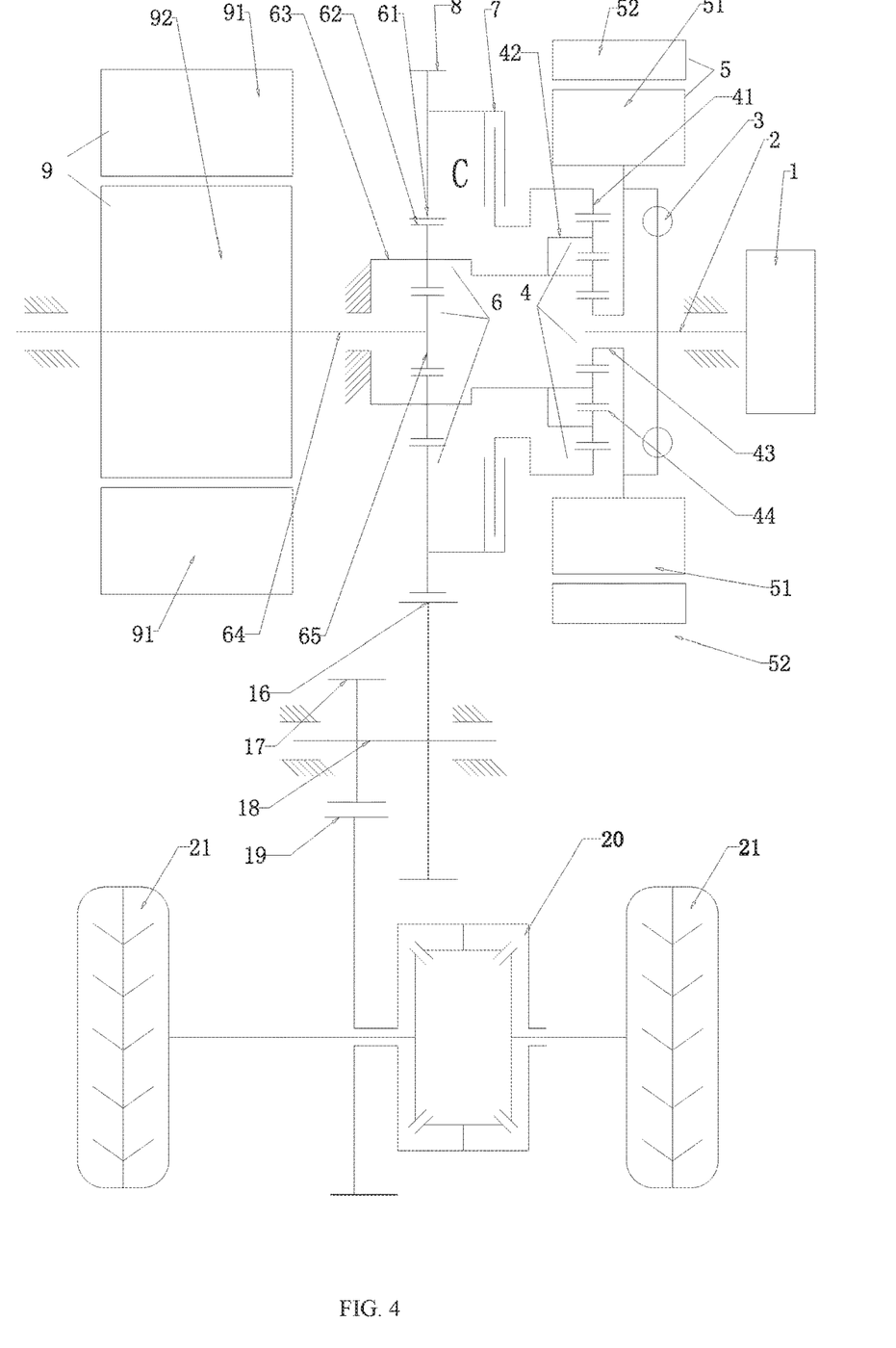
FIG. 4 is a schematic structural diagram of power transmission of the hybrid electric vehicle (using a double-row planetary gear set) according to Embodiment 1 of the invention.

Refer to FIG. 2 and FIG. 4. A hybrid transmission according to the invention includes an engine 1, a generator 5, an electric motor 9, a first planetary gear set 4, a clutch 7, and a second planetary gear set 6.

The engine 1, the generator 5, and the electric motor 9 are arranged coaxially.

A crankshaft 2 of the engine 1 is connected to the first planetary gear set 4. The engine 1 can drive the first planetary gear set 4 to operate through the crankshaft 2. A sun gear 43 of the first planetary gear set is connected to a rotor 51 of the generator 5 to drive the rotor 51 to rotate so as to generate electricity. The generator 5 can also provide a driving torque for starting the engine 1.

The clutch 7 includes a first driving end and a second driving end that can be engaged or disengaged. The first driving end is connected to a planet carrier 42 of the first planetary gear set, and the second driving end is connected to a ring gear 61 of the second planetary gear set 6. The ring gear 61 is also provided with an output gear 8 for driving wheels. A rotor 92 of the electric motor 9 is connected to a sun gear axle 64 of the second planetary gear set 6, and the electric motor 9 can drive the second planetary gear set 6 to rotate through the sun gear axle 64.

In the case that the first driving end and the second driving end of the clutch 7 are in the engagement state, the first driving end, driven by the first planetary gear set 4, can drive the second driving end to rotate. In the case that the first driving end and the second driving end of the clutch 7 are in the disengagement state, the first driving end will not drive the second driving end to rotate synchronously, and at the same time, the motor 9 can be rotated by the second planetary gear set 6 alone, so as to drive the wheels 21 through the output gear 8, reducing the effect of the drag resistance by the engine 1.

The hybrid transmission according to the invention has three prime movers: an internal combustion engine 1 consuming liquid fuels, a generator 5 mainly used to generate electrical energy, and an electric motor 9 mainly used to convert electric energy into mechanical energy. The generator 5 can also be used to start the engine 1, and the electric motor 9 can also be used to generate electricity when braking energy of a vehicle is recovered.

Alternatively, the first planetary gear set 4 and the engine 1 are arranged coaxially. The term "arranged coaxially" as used herein means that the crankshaft 2 of the engine 1 and the sun gear 43 of the first planetary gear set 4 are arranged coaxially.

Alternatively, the second planetary gear set 6 and the engine 1 are arranged coaxially. Similarly, the term "arranged coaxially" as used herein means that the crankshaft 2 of the engine 1 and the sun gear 65 of the second planetary gear set 6 are arranged coaxially.

In the aforementioned technical solutions, the engine 1, the generator 5, the electric motor 9, the first planetary gear set 4 and the second planetary gear set 6 are arranged coaxially, so that the whole transmission has only two axes (i.e., the crankshaft 2 of the engine 1, and the output shaft 18), which not only improves the gear transmission accuracy and NVH (noise, vibration, and acoustic vibration roughness) performance, but also simplifies the manufacturing difficulty and reduces costs.

In the embodiment, the first planetary gear set 4 can have a variety of different structure styles. Hereafter, the first planetary gear set 4 with two different structure styles will be mainly described.

Structure Style 1

Figure 3:
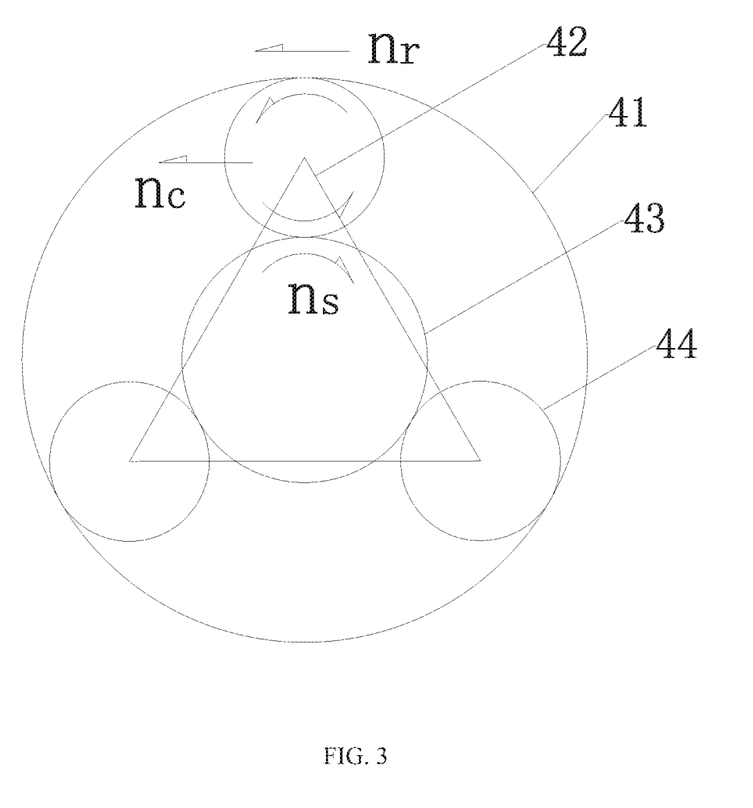
FIG. 3 is a schematic diagram of a rotation speed of the single-row planetary gear set according to Embodiment 1 of the invention.

Refer to FIG. 2 and FIG. 3. The first planetary gear set 4 is configured as a single-row planetary gear train including a ring gear 41, a planet carrier 42, a sun gear 43, and three planetary gears 44. The ring gear 41 is fixed on a reducer housing, and is meshed with the sun gear 43 through the planetary gears 44. The planet carrier 42 is connected to the planetary gears 44. The planet carrier 42 of the first planetary gear set 4 is configured to be rotatable.

In specific implementation, the planet carrier 42 of the first planetary gear set 4 is connected to the crankshaft 2 of the engine 1, the first driving end of the clutch 7, and the planetary gears 44. The sun gear 43 of the first planetary gear set 4 is connected to the rotor 51 of the generator 5. When the engine 1 operates, power is transmitted to the planet carrier 42 through the crankshaft 2. A part of the power is transmitted to the first driving end of the clutch 7 through the planet carrier 42, and the other part of the power is transmitted to the rotor 51 of the generator 5 through the planetary gears 44 and the sun gear 43 of the first planetary gear set 4, so that the rotor 51 is driven to rotate and generate electricity with a stator 52.

Alternatively, the second planetary gear set 6 has a planet carrier 63, a sun gear 65, a sun gear axle 64, planetary gears 62 and a ring gear 61. The planet carrier 63 is configured to be stationary and is fixedly connected to a transmission housing. The ring gear 61 and the sun gear 65 are connected by the planetary gears 62 which are meshed with the ring gear 61 and the sun gear 65. The ring gear 61 is connected to the second driving end of the clutch 7, and is also provided with an output gear 8 which is connected to an external wheel drive mechanism. The sun gear 65 is connected to a rotor 92 of the electric motor 9 through the sun gear axle. The second planetary gear set 6 can also increase the output torque of the electric motor 9.

The hybrid transmission with the aforementioned structure style according to the invention can achieve the following common functions:

1. Starting and charging of the engine 1; 2. Individually driving of the engine 1; 3. Individually driving of the electric motor 9; 4. Simultaneously driving of the engine 1 and the electric motor 9; and 5. Recovery of braking energy of a vehicle. The working principles achieving the aforementioned functions are described as follows:

1. With Regard to Starting and Charging of the Engine 1

After the crankshaft 2 of the engine 1 is increased in speed by the first planetary gear set 4, the power is transmitted to the rotor 51 of the generator 5, and the generator 5 operates to start the engine 1. In contrast, the operation of the engine 1 can drive the generator 5 to charge batteries.

In the first planetary gear set 4 shown in FIG. 3, the rotation speed of the generator 5 is shown as:

$$n_{s1}=(\alpha_1+1)n_{c1} \quad (1)$$

where, $\alpha_1$ is a ratio of the number of teeth of the ring gear 41 to the number of teeth of the sun gear 43, and generally has a value in the range of 2 to 3. $n_{c1}$ is a rotation speed of the planet carrier 42, i.e., a rotation speed of the engine 1. The first planetary gear set 4 is provided to increase the speed of engine 1 and then drive generator 5 to operate. Generally, the efficient charging speed of generator 5 is greater than 2000 rpm, which is much higher than an idle speed of the engine 1. In the technical solution of the invention, use of the first planetary gear set 4 enables the engine 1 to efficiently charge at an idle speed.

2. With Respect to Individually Driving of the Engine 1

When the engine 1 operates, the first driving end and the second driving end of the clutch 7 are engaged so that all or part of the power of the engine 1 can be transmitted to the external wheel drive mechanism through the second planetary gear set 6, thereby driving wheels to run.

When the engine 1 is selected to perform driving alone, a certain amount of the power can be distributed to an onboard battery through the generator 5 to perform charging, the remaining power of the engine 1 can be distributed to the generator 5 depending on vehicle operation, thereby improving fuel economy. In the case that a vehicle runs at full throttle, the torque of the generator 5 can be controlled to 0, and all the power of the engine 1 can be distributed to the wheel drive mechanism to ensure the acceleration performance of the vehicle.

3.3 with Respect to Individually Driving of the Electric Motor 9

In the case that the first driving end and the second driving end of the clutch 7 are in the disengagement state, the electric motor 9 is started, the rotor 92 of the electric motor 9 drives the ring gear 61 to rotate in a reverse direction ($n_r$ as shown in FIG. 3) through the sun gear 65 of the second planetary gear set 6. Since the planet carrier 63 of the second planetary gear set 6 is fixed, the torque of the ring gear 61 is shown as:

$$T_{r2} = \alpha_2 T_{s2} \tag{2}$$

where, $T_{s2}$ is the torque of the sun gear 65, i.e., the torque of the electric motor 9; $T_{r2}$ is the torque received by the ring gear 61, which is transmitted to the wheel drive mechanism through the output gear 8 on the ring gear 61; $\alpha_2$ is a ratio of the number of teeth of the ring gear 61 to the number of teeth of the sun gear 65, and generally has a value in the range of 2 to 3.

From formula (2), it can be seen that the second planetary gear set 6 increases the torque of the electric motor 9 by more than two times, effectively reducing the size of the electric motor or improving the acceleration performance of vehicles.

Since the clutch 7 is connected in series between the first planetary gear set 4 and the second planetary gear set 6, in the case that the clutch 7 is disengaged, there is no drag resistance of the engine 1 when the electric motor 9 performs driving, thereby improving the fuel economy of the vehicle.

3.4 with Respect to Simultaneously Driving of the Engine 1 and the Electric Motor In the case that the electric motor 9 and the engine 1 are simultaneously started, the clutch 7 is engaged, the resulting torque obtained by subtracting a torque dragging the generator 5 from the torque of the engine 1 is transmitted to the ring gear 61 of the second planetary gear set 6 through the clutch 7. The torque of the electric motor 9 is amplified by the second planetary gear set 6 and then superimposed on the ring gear 61. When the torque of the control generator 5 is 0, the maximum output torque (on the output gear) can be:

$$T_8 = T_e + \alpha_2 T_{s2} \tag{3}$$

where, in formula (3), $T_e$ is the output torque of the engine 1; $\alpha_2$ is a ratio of the number of teeth of the ring gear 61 to the number of teeth of the sun gear 65; $T_{s2}$ is the torque of the sun gear 65, i.e. the torque of the electric motor 9, and $T_8$ is the output torque of the output gear 8. The maximum output torque is equivalent to twice the output torque of an ordinary engine 1, which can ensure good acceleration performance of vehicles.

3.5 with Regard to Recovery of Braking Energy of a Vehicle

In the case that a vehicle is in the deceleration braking state, the vehicle inertia drags the output gear 8 and the ring gear 61 of the second planetary gear set 6 through the wheel drive mechanism. The first driving end and the second driving end of the clutch 7 are controlled to be disengaged, and the inertial force acting on the ring gear 61 drags the sun gear 65 to rotate through the second planetary gear set 6. The sun gear 65 drives the rotor 92 of the electric motor 9 through the sun gear axle 64 to act on the stator 91 so as to generate electricity, realizing the recovery of braking energy.

The technical solution adopting the abovementioned Structural style 1 is suitable for hybrid electric vehicles which have a low idle speed of an engine 1 and a large battery capacity and are mainly driven by electric motors.

For hybrid vehicles with high idle speed and low torque of an engine 1, an alternative scheme of adopting a double-row planetary gear set as shown in FIG. 4 can be adopted.

Structure Style 2

Figure 5:
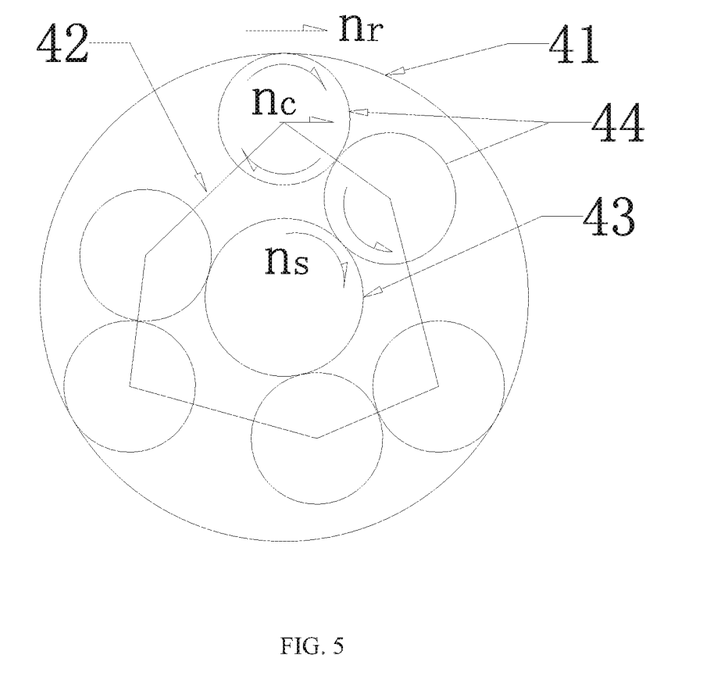
FIG. 5 is a schematic diagram of a rotation speed of a double-row planetary gear set according to Embodiment 1 of the invention.

In the alternative shown in FIGS. 4 and 5, a double-row planetary gear set is used instead of the single-row planetary gear set shown in FIGS. 2 and 3. The double-row planetary gear set includes a ring gear 41, a planet carrier 42, a sun gear 43, and two sets of planetary gears 44. Preferably, each of the two sets of planetary gears 44 has three planetary gears. A first set of planetary gears 44 are meshed with the sun gear 43, and a second set of planetary gears 44 are meshed with the corresponding first set of planetary gears 44 and the ring gear 41. The planet carrier 42 is connected with each planetary gear 44. The sun gear 43 is separately connected to the crankshaft 2 of the engine 1 and a rotor 51 of the generator 5. The ring gear 41 of the first planetary gear set 4 is also connected to the first driving end of the clutch 7. The planet carrier 42 is configured to be stationary.

FIG. 5 shows rotation directions of the respective gears in the double-row planetary gear set. The reason why the double-row planetary gear set is used is to maintain the ring gear 41 and the sun gear 43 to rotate in the same direction, so as to use an engine 1 with a traditional rotation direction. Compared with FIG. 2, the connection mode of the first planetary gear set 4 can effectively increase the torque of the engine 1 through the above improvements.

The torque output by the ring gear 41 is shown as:

$$T_{r1} = \alpha_1 T_e \tag{4}$$

Where, $T_e$ is a value obtained by subtracting the drag torque of the generator 5 from the output torque of the engine 1, and $\alpha_1$ is a ratio of the number of teeth of the ring gear 41 to the number of teeth of the sun gear 43.

if $\alpha_1$ has a value of 3, the torque of the engine 1 will be amplified by 3 times.

Once the clutch 7 is engaged, the torque transmitted to the output gear 8 is shown as:

$$T_8 = \alpha_1 T_e + \alpha_2 T_{s2} \tag{5}$$

$T_8$, $\alpha_1$, $\alpha_2$, $T_e$, and $T_{s2}$ in formula (5) are as defined in formula (3) and formula (4). Compared with the above formula (3), the output torque of the double-row planetary gear set is larger. Even without the electric motor 9, the output torque of the engine 1 alone is sufficient to drive a vehicle to start. This solution is more suitable for some small engines 1, whose function is mainly to generate electricity at high speeds.

Alternatively, in the hybrid transmission according to Embodiment 1, the planet carrier 63 of the second planetary gear set 6 is configured to be stationary, and the second planetary gear set 6 can increase the output torque of the electric motor 9.

Alternatively, the second planetary gear set 6 has a planet carrier 63, a sun gear 65, a sun gear axle 64, planetary gears 62, and a ring gear 61. The planet carrier 63 is configured to be stationary, and is fixedly connected to a transmission housing. The ring gear 61 and the sun gear 65 are connected through the planetary gear 62 which is meshed with the ring gear 61 and the sun gear 65. The ring gear 61 is connected to the second driving end of the clutch 7, and is also provided with an output gear 8 which is connected to an external wheel drive mechanism. The sun gear 65 is connected to the rotor 92 of the electric motor 9 through the sun gear axle 64. The second planetary gear set 6 can also increase the output torque of the electric motor 9.

In the hybrid transmission according to Embodiment 1 of the invention, alternatively, the clutch 7 is a drum clutch 7. An inner drum of the clutch 7 serves as the abovementioned first driving end, and an outer drum of the clutch 7 serves as the abovementioned second driving end.

Alternatively, the hybrid transmission further includes a shock absorber 3 which is connected to the crankshaft 2 of the engine 1. The shock absorber 3 is used to reduce vibration of the crankshaft 2 of the engine 1 and vibration caused by transmitting between the crankshaft 2 of the engine 1 and the first planetary gear set 4, improving NVH (noise, vibration and acoustic vibration roughness) performance.

Alternatively, the generator 5 is also connected to the crankshaft of the engine 1 to start the engine 1.

Embodiment 2

Figure 6:
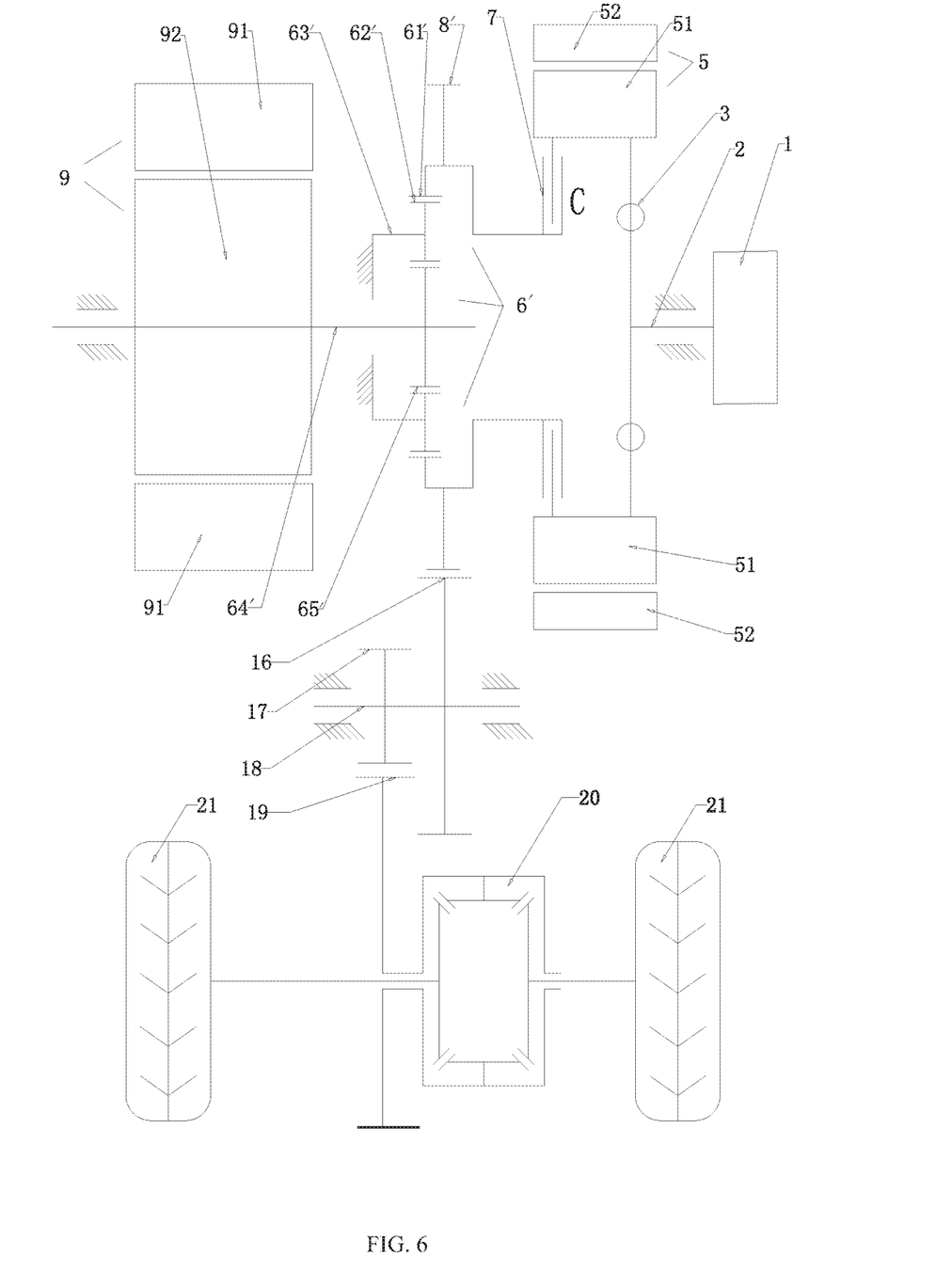
FIG. 6 is a schematic structural diagram of power transmission of a hybrid electric vehicle according to Embodiment 2 of the invention.

Embodiment 2 of the invention provides another hybrid transmission. The hybrid transmission has an improved structure based on the hybrid transmission with two planetary gear sets according to the aforementioned Embodiment 1. In the hybrid transmission according to Embodiment 2, the first planetary gear set 4 is omitted, so that the overall structure is simpler.

Refer to FIG. 6. The hybrid transmission includes an engine 1, a generator 5, an electric motor 9, a clutch 7, and a third planetary gear set 6'.

The engine 1, the generator 5 and the electric motor 9 are arranged coaxially.

The crankshaft 2 of the engine 1 is connected with a rotor 51 of the generator 5 to drive the rotor 51 to rotate, so as to drive the generator 5 to generate electricity. When the generator 5 operates, on the one hand, it can charge the on-board battery, on the other hand, it can provide a starting torque for the engine 1.

The clutch 7 includes a first driving end and a second driving end that can be engaged or disengaged. The first driving end is connected to the rotor of the generator 5, and the second driving end is connected to a ring gear 61' of the third planetary gear set 6'. In addition, the ring gear 61' is provided with an output gear 8 for driving wheels. A rotor of the electric motor 9 is connected to a sun gear axle 64' of the third planetary gear set 6'.

In the case that the first driving end and the second driving end of the clutch 7 are in the engagement state, the first driving end which is driven by the rotor 51 of the generator 5 can rotate together with the second driving end. In the case that the first driving end and the second driving end of the clutch 7 are in the disengagement state, the first driving end does not rotate synchronously with the second driving end. Also, the motor 9 operates individually to drive the third planetary gear set 6' to rotate, and then drive wheels through the output gear 8, reducing the drag resistance of the engine 1.

The hybrid transmission according to Embodiment 2 of the invention also has three prime movers: an internal combustion engine 1 consuming liquid fuels, a generator 5 mainly used to generate electrical energy, and an electric motor 9 mainly used to convert electrical energy into mechanical energy. The generator 5 can also be used to start the engine 1, and the electric motor 9 can also be used to generate electricity when braking energy of a vehicle is recovered.

Alternatively, a planet carrier 63' of the third planetary gear set 6' is configured to be stationary. The third planetary gear set 6' can increase the output torque of the electric motor 9. It should be noted here that the third planetary gear set 6' according to Embodiment 2 is equivalent to the second planetary gear set 6 according to Embodiment 1, and both of them have common functions, so that the structure of the third planetary gear set 6' is omitted here.

Alternatively, the clutch 7 is a drum clutch 7. An inner drum of the clutch 7 serves as the first driving end, and an outer drum of the clutch 7 serves as the second driving end.

Alternatively, the hybrid transmission further includes a shock absorber 3 which is connected to the crankshaft 2 of the engine 1. The shock absorber is used to reduce vibration of the crankshaft 2 of the engine 1 and vibration caused by transmitting between the crankshaft 2 of the engine 1 and the rotor of the generator 5, improving NVH (noise, vibration and acoustic vibration roughness) performance.

Since the first planetary gear set 4 is omitted in the technical solution of Embodiment 2, the crankshaft 2 of the engine 1 is directly connected to the rotor of the generator 5, the speed and torque of the engine 1 are not amplified. The technical solution is more suitable for hybrid electric vehicles whose engines 1 are mainly used for high-efficiency power generation and range extension.

Embodiment 3

Back to FIG. 2, FIG. 4 and FIG. 6. A hybrid electric vehicle according to Embodiment 3 of the invention includes wheels 21, a wheel drive mechanism, a differential 20, and a hybrid transmission according to the aforementioned Embodiment 1 or Embodiment 2.

The wheels 21 are connected to the differential 20 through axles. The wheel drive mechanism is separately connected to the differential 20 and the output gear 8 of the hybrid transmission in a transmission way.

Alternatively, the wheel drive mechanism includes an output shaft 18, an output shaft driven gear 16 and an output shaft driving gear 17. The output shaft driven gear 16 and the output shaft driving gear 17 are coaxially connected. The output shaft driving gear 17 is connected to a ring gear 19 of the differential 20, and the output shaft driven gear 16 is connected to the output gear 8.

When the hybrid transmission is in operation, the power of the output gear 8 in the hybrid transmission is transmitted to the wheels 21 successively through the output shaft driven gear 16, the output shaft 18, the output shaft driving gear 17 and the differential 20, so as to drive the wheels to rotate.

INDUSTRIAL APPLICABILITY

The engine 1, the generator 5, and the electric motor 9 are arranged coaxially, and the crankshaft 2 of the engine 1 is connected to the rotor of the generator 5 directly or through the first planetary gear set, which not only improves the gear transmission accuracy and NVH performance (noise, vibration, and acoustic vibration roughness), but also simplifies the manufacturing difficulty and reduces costs.

2. In order to reduce the defect that the drag resistance of the engine 1 is large when the electric motor 9 operates, the engine 1 is disengaged from the electric motor 9 by providing the clutch 7 which is disengagable in the invention, thereby reducing the drag resistance of the engine 1 when the electric motor 9 operates, and improving fuel economy.

3. In order to solve the problem of power dispersion when an engine in an existing two-motor split hybrid transmission operates, in the technical solution of the invention, when the engine 1 operates and a large acceleration is required, the torque of the generator 5 can be controlled to 0, so that all the torque of the engine 1 can be transmitted to the wheel drive mechanism through the clutch 7. If the electric motor 9 also operates, the torque of the electric motor 9 is also transmitted to the wheel drive mechanism through the corresponding planetary gear sets. The torques of the two power sources are superimposed on the wheel drive mechanism to maximize the acceleration performance of the vehicle.

What is claimed is:

1. A hybrid transmission, wherein the hybrid transmission includes an engine, a generator, an electric motor, a first planetary gear set, a clutch, and a second planetary gear set; wherein,
the engine, the generator and the electric motor are arranged coaxially;
a crankshaft of the engine is connected to the first planetary gear set, and the first planetary gear set is connected to a rotor of the generator to drive the rotor to rotate; and
the clutch includes a first driving end and a second driving end that can be engaged or disengaged; wherein the first driving end is connected to the first planetary gear set, the second driving end is connected to a ring gear of the second planetary gear set; and a sun gear axle of the second planetary gear set is connected to a rotor of the electric motor;
the planet carrier of the second planetary gear set is configured to be stationary, and the second planetary gear set is capable of increasing an output torque of the electric motor.

2. The hybrid transmission according to claim 1, wherein the ring gear of the second planetary gear set is further provided with an output gear for driving wheels.

3. The hybrid transmission according to claim 1, wherein the second planetary gear set and the engine are coaxially arranged.

4. The hybrid transmission of claim 1, wherein the first planetary gear set is capable of increasing a speed of the engine and driving the generator to rotate.

5. The hybrid transmission according to claim 1, wherein the first planetary gear set is configured as a single-row planetary gear train; a planet carrier of the first planetary gear set is connected to the crankshaft of the engine, the first driving end of the clutch and a planetary gear of the first planetary gear set, respectively; and a sun gear of the first planetary gear set is connected to the rotor of the generator.

6. The hybrid transmission according to claim 1, wherein the first planetary gear set is configured as a double-row planetary gear train; a sun gear of the first planetary gear set is connected to the crankshaft of the engine and a rotor of the generator, respectively; and a ring gear of the first planetary gear set is connected to the first driving end of the clutch.

7. The hybrid transmission according to claim 1, wherein the planet carrier of the first planetary gear set is configured to be rotatable.

8. The hybrid transmission according to claim 1, wherein the clutch is a drum clutch; an inner drum of the clutch is the first driving end, and an outer drum of the clutch is the second driving end.

9. The hybrid transmission according to claim 1, further including a shock absorber connected to the crankshaft of the engine.

10. The hybrid transmission according to claim 1, wherein the generator is further electrically connected to the engine to drive the engine to rotate.

11. A hybrid transmission, wherein the hybrid transmission includes an engine, a generator, an electric motor, a clutch, and a planetary gear set; wherein,
the engine, the generator and the electric motor are arranged coaxially;
a crankshaft of the engine is connected to a rotor of the generator to drive the rotor to rotate;
the clutch includes a first driving end and a second driving end that can be engaged or disengaged; the first driving end is connected to the rotor of the generator, and the second driving end is connected to a ring gear of the planetary gear set; and
the ring gear is directly connected with an output gear for driving wheels, and a rotor of the electric motor is connected to a sun gear axle of the planetary gear set;
a planet carrier of the planetary gear set is configured to be stationary, and the planetary gear set is capable of increasing an output torque of the electric motor.

12. The hybrid transmission of claim 11, wherein the clutch is a drum clutch, an inner drum of the clutch is the first driving end, and an outer drum of the clutch is the second driving end.

13. The hybrid transmission according to claim 11, further including a shock absorber connected to the crankshaft of the engine.

14. A hybrid electric vehicle, wherein the hybrid electric vehicle including wheels, a wheel drive mechanism, a differential, and a hybrid transmission according to claim 2; the wheels are connected to the differential through wheel axles, and the wheel drive mechanism is connected to the differential and an output gear in a transmission way, respectively.

15. The hybrid vehicle according to claim 14, wherein the wheel drive mechanism includes an output shaft, an output shaft driven gear, and an output shaft driving gear; the output shaft driven gear and the output shaft driving gear are coaxially connected; the output shaft driving gear is used to connect a ring gear of the differential, and the output shaft driven gear is used to connect the output gear.

16. A hybrid electric vehicle, wherein the hybrid electric vehicle including wheels, a wheel drive mechanism, a differential, and a hybrid transmission according to claim 11; the wheels are connected to the differential through wheel axles, and the wheel drive mechanism is connected to the differential and the output gear in a transmission way, respectively.

17. The hybrid vehicle according to claim 16, wherein the wheel drive mechanism includes an output shaft, an output shaft driven gear, and an output shaft driving gear; the output shaft driven gear and the output shaft driving gear are coaxially connected; the output shaft driving gear is used to connect a ring gear of the differential, and the output shaft driven gear is used to connect the output gear.

* * * * *